J. A. BAILEY.
DIRIGIBLE AUTOMOBILE LAMP SUPPORT.
APPLICATION FILED NOV. 10, 1913.
1,112,666.
Patented Oct. 6, 1914.
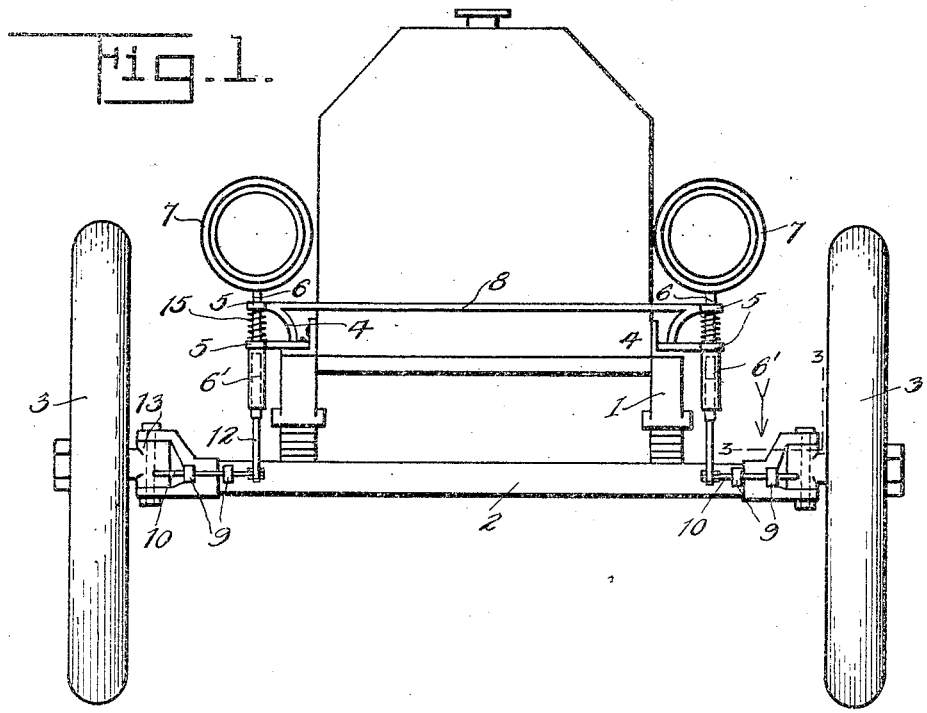
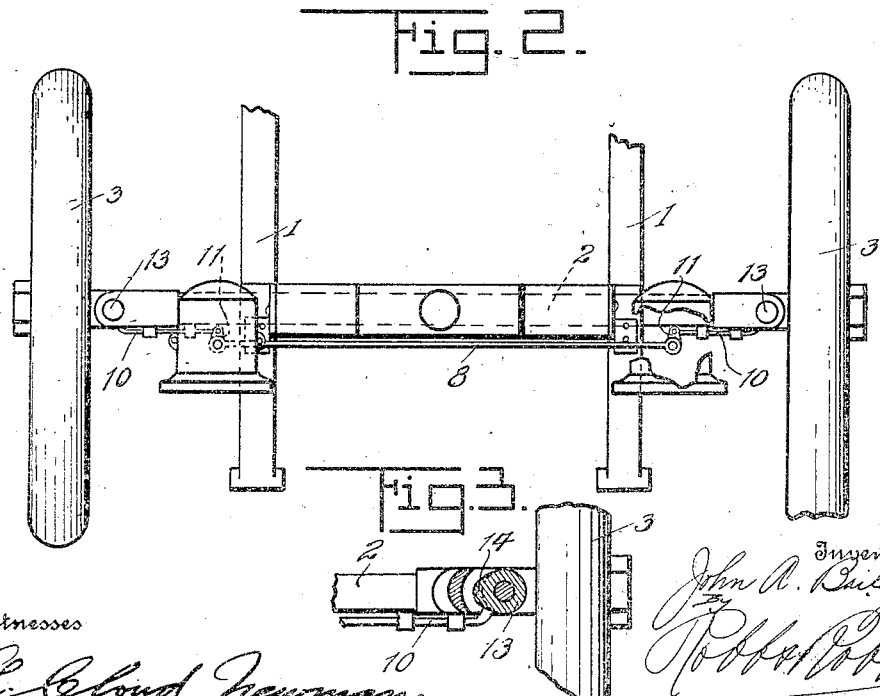

UNITED STATES PATENT OFFICE.

JOHN A. BAILEY, OF BRICE, TEXAS.

DIRIGIBLE AUTOMOBILE LAMP-SUPPORT.

1,112,666.  Specification of Letters Patent.  Patented Oct. 6, 1914.

Application filed November 10, 1913. Serial No. 800,232.

*To all whom it may concern:*

Be it known that I, JOHN A. BAILEY, a citizen of the United States, residing at Brice, in the county of Hall and State of Texas, have invented certain new and useful Improvements in Dirigible Automobile Lamp-Supports, of which the following is a specification.

The present invention relates to improvements in dirigible automobile lamp supports by means of which rays of light may be automatically directed in the direction of travel of motor vehicles.

It has heretofore been proposed to accomplish the foregoing function so that both of the lamps ordinarily provided on a motor vehicle will be shifted in accordance with the change of direction of travel of the vehicle, but this results in the discontinuance of illumination in the original path of movement of said vehicle.

The object, therefore, in view in my present invention is to provide means for operating one of the lamps of the vehicle so as to follow the direction of travel of the same, while maintaining the other of the lamps stationary so that both the original path of movement and the path of change of movement are illuminated. Various means for accomplishing this object may be employed but one embodiment of the invention is set forth in the drawings and the description which is to follow.

With the above and other objects in view, this invention consists in the construction, combination and arrangement of parts all as hereinafter fully described, claimed and illustrated in the accompanying drawings, wherein:

Figure 1 is a front elevation of a motor vehicle showing an embodiment of my invention attached thereto. Fig. 2 is fragmentary plan view, parts being broken away to show more clearly the arrangement of details of construction. Fig. 3 is a fragmentary view, partly in section showing more clearly the engaging connection of the wheel spindle with the operating means for the lamp standards.

Throughout the following detail description, and on the several figures of the drawings, similar parts are referred to by like reference characters.

Specifically describing the preferred embodiment of my device and referring to the drawings, 1 designates the frame of a motor vehicle, 2 the front axle, and 3 the forward steering wheels, all of usual construction. At each side of the frame is disposed a lamp bracket 4 preferably comprising a pair of spaced arms 5 in which is journaled at the respective sides a lamp standard 6 carrying its usual form of lamp 7. The lamp brackets 4 are preferably provided with a tie rod 8 for making more rigid the construction as is customary in this art.

Each of the lamp standards 6 has its lower extremity extending through the lower spaced arm 5 of the bracket 4. This extremity is preferably of hollow socket form, being designated by the numeral 6'. The forward axle of the motor vehicle at each of its extremities is provided with supporting means such as keepers 9 in which is slidably mounted for movement longitudinally of the axle, the member or rod 10, which rod is preferably connected at its inner end with the rearwardly projecting arm 11 formed on the lower extremity of a vertically disposed connecting rod 12, which latter rod extends into the hollow socket extremity 6' of the adjacent lamp standard 6. The extremity 6' aforesaid is preferably square interiorly and the connecting rod 12 is formed likewise so that a positive connection between the standard and the rod is provided. This form of connection permits free vertical movement of the rod 12 to accommodate for the movement of the frame of the machine with respect to the axle 2 due to vibration and resiliency of the springs usually employed.

The free end of each slidable member 10 projects proximate the spindle 13 of the adjacent wheel and, as shown most clearly in Fig. 3 of the drawings, this spindle may be formed with a cam or similar projection 14 which is adapted to engage the extremity of the member 10 upon turning of the wheel in one direction.

The construction and arrangement of the several parts hereinbefore described is identical at each side of the machine and for this reason similar reference characters are employed to designate similar parts.

The operation of the device is as follows: Upon turning of the motor vehicle by movement of the wheels in a direction to the left it will be obvious that the spindle of the left forward wheel will turn in accord with the direction of movement of the wheel and in so doing the cam or projection 14 thereon engages the extremity of the sliding member 10, and causes said member to move inwardly in a direction longitudinally of the axle 2. By reason of the connection of the member 10 with the arm 11 on the lower extremity of the connecting rod 12, the last mentioned rod will turn and rotate the lamp standard 6 so as to move the lamp at the left side of the vehicle in a direction corresponding to the direction of travel of said vehicle. By reason of the fact that the cam 14 on the spindle of the opposite or right wheel is moved in a direction contrary to that on the spindle of the left wheel, said cam will not operate the sliding member 10 at the opposite or right side of said vehicle and therefore the lamp at the right side of the vehicle will remain stationary directing its rays in the original direction of movement of the vehicle. Turning of the wheels in a direction opposite to that described, or toward the right, will move the right lamp to accord with said direction while the left lamp will remain stationary, thereby providing that one lamp will remain stationary while the other lamp is moved in the direction of travel of the vehicle.

Interposed between the spaced arms 5 of each lamp bracket and about the lamp standard 6 is a torsion spring 15 connected at one end to the lamp standard and at its other end to the bracket. The function of this spring is to maintain its coöperating lamp in the normal position indicated in Fig. 1 of the drawing. In addition the spring returns the lamp to its normal position when said lamp has been operated by a wheel in turning the vehicle in one or the other of the directions.

It will be apparent to those skilled in the art to which this invention refers that changes may readily be made in the details of construction of the invention without departing from the spirit of the invention and within the scope of the appended claims.

Having thus described the invention what is claimed as new is:

1. In combination, a motor vehicle, steering wheels therefor including steering spindles, lamps carried by the vehicles, and operating means for turning said lamps disposed in the path of the movement of the spindles and arranged for operative contact with the latter only upon turning of the wheels in one direction whereby to operate the lamp on the side corresponding to the direction of turn without operating the other lamp.

2. In combination, a motor vehicle, steering wheels therefor including steering spindles having actuating means extending therefrom, lamps carried by the vehicle, operating means normally out of active relation but disposed in the path of movement of said actuating means whereby upon turning of the wheels to turn a lamp in accord with the change of direction of the travel of the vehicle.

3. In combination, a motor vehicle including a steering wheel and spindle therefor formed with a cam member, a lamp, operating means for said lamp disposed in the path of movement of the cam member and adapted to be engaged thereby to turn the lamp in one direction of the turn of the steering wheel and out of the path of movement of the cam member when said wheel is turned in the opposite direction whereby to maintain the lamp stationary.

4. In combination, a motor vehicle, steering wheels therefor, lamps carried by said vehicle, operating means for said lamps comprising a connecting rod and a sliding member connected at one end to said connecting rod and adapted to be engaged at its other end with the steering wheel spindle when one of said wheels turns in one direction, said sliding member not being engageable by the spindle upon turning of the wheel in the opposite direction.

5. In combination, a motor vehicle, steering wheels therefor, lamps carried by said vehicle, operating means for said lamps comprising a connecting rod and a sliding member connected at one end to said connecting rod and adapted to be engaged at its other end with the steering wheel spindle when one of said wheels turns in one direction, said sliding member not being engageable by the spindle upon turning of the wheel in the opposite direction, and a spring normally tending to hold the lamp in its inoperative position.

6. In combination, a motor vehicle, steering wheels therefor, including steering spindles, lamps disposed at each side of said vehicle, standards for said lamps, brackets in which said standards are journaled, said standards having hollow extremities, means for operating each of said standards comprising a connecting rod having one end thereof extending into the hollow extremity of its coöperating lamp standard and a slidable rod connected to the other end of the connecting rod aforesaid, and means on each of the steering wheel spindles adapted to engage the free end of the adjacent sliding member aforesaid for turning the lamps in one direction.

7. In combination, a motor vehicle, steering wheels therefor, including steering spindles, lamps disposed at each side of said vehicle, standards for said lamps, springs holding the lamps in normal position, the lamp standards aforesaid terminating in socket extremities, means for operating said standards to rotate one of said lamps in the direction of turning movement of the steering wheels and comprising a connecting rod for each of said standards extending into the socket extremities thereof whereby to permit relative movement of the connecting rod and the lamp standards, a sliding rod carried by the axle aforesaid and connected to each of the connecting rods aforesaid at one end and adapted to coöperate at the other end with the adjacent steering spindle, and cams on the steering spindles for engaging the free end of the sliding rods to rotate the lamps when said steering wheels are turned in either direction.

In testimony whereof I affix my signature in presence of two witnesses.

JOHN A. BAILEY.

Witnesses:
J. H. HALLOMAN,
W. H. YOUNGBLOOD.